July 17, 1962 E. W. BUCK 3,044,321
ADJUSTABLE MAGNETIC DRILL MOUNT
Filed Nov. 7, 1957 4 Sheets-Sheet 1
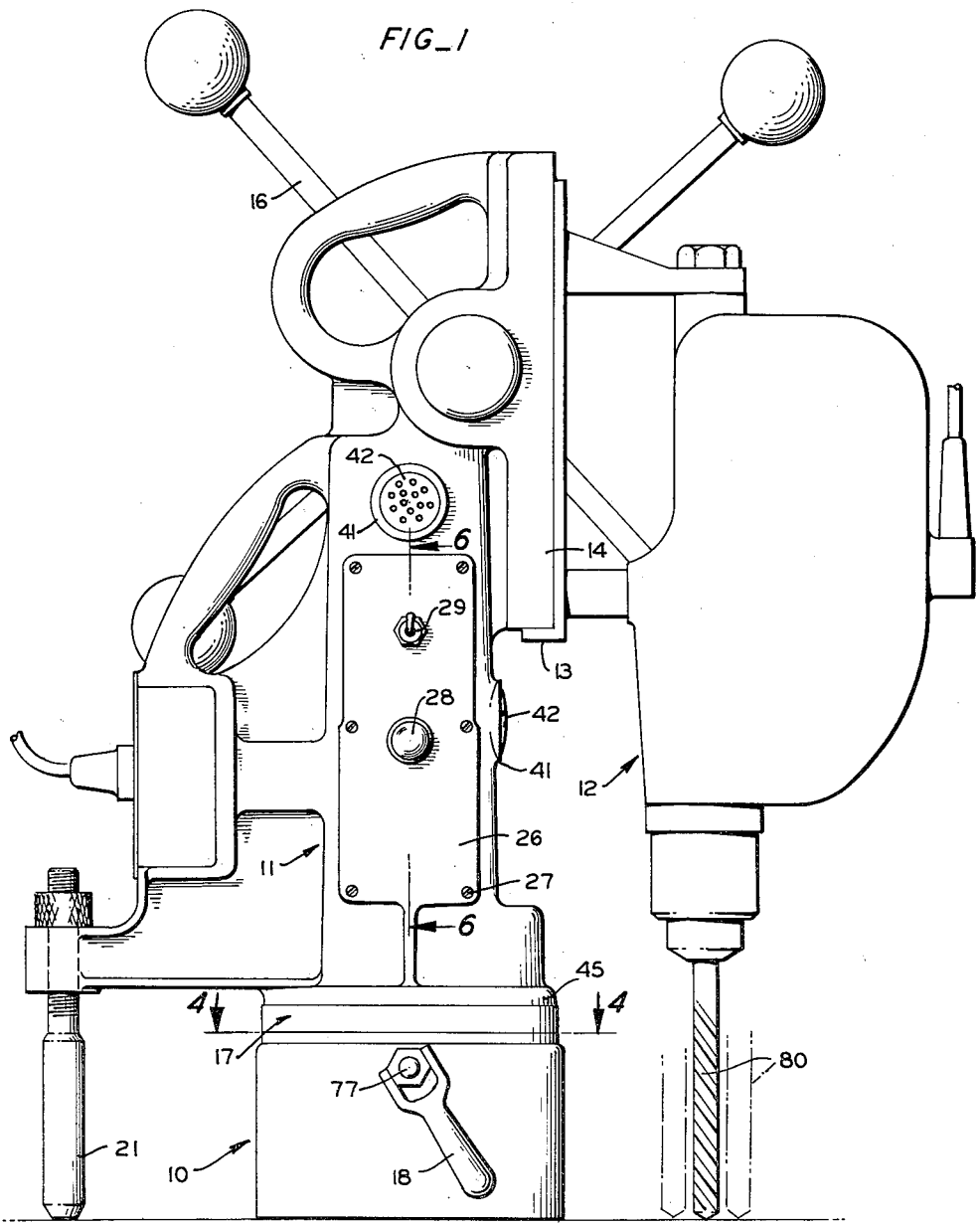
FIG_1
INVENTOR.
EUGENE W. BUCK
BY
ATTORNEYS July 17, 1962 — E. W. BUCK — 3,044,321
ADJUSTABLE MAGNETIC DRILL MOUNT
Filed Nov. 7, 1957 — 4 Sheets-Sheet 2
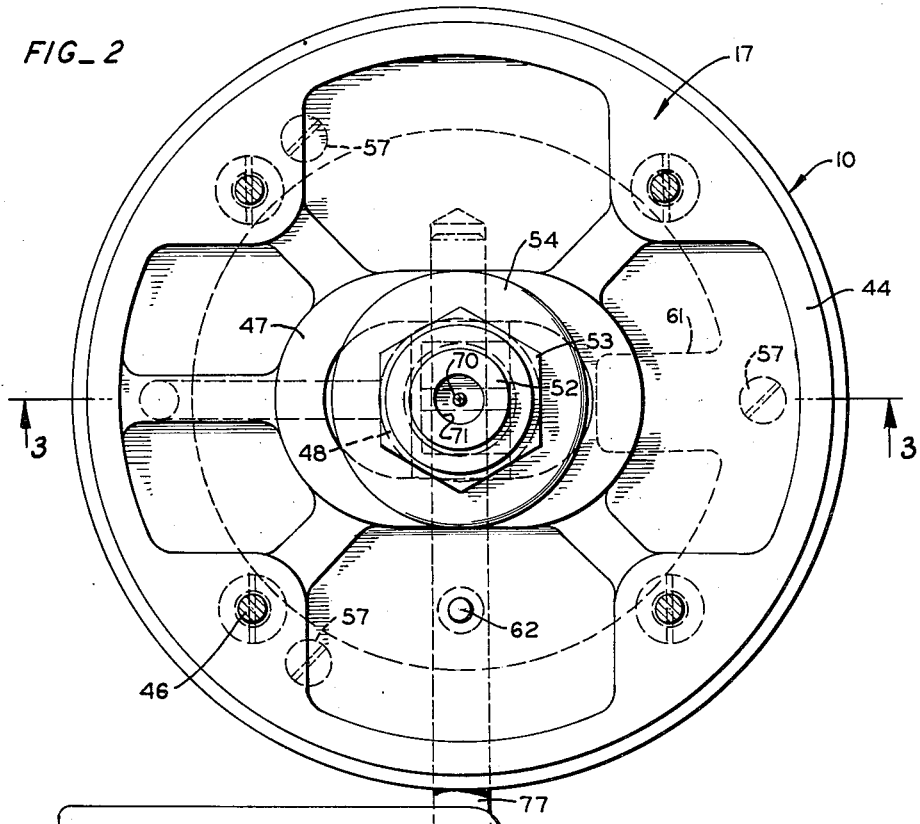
FIG_2
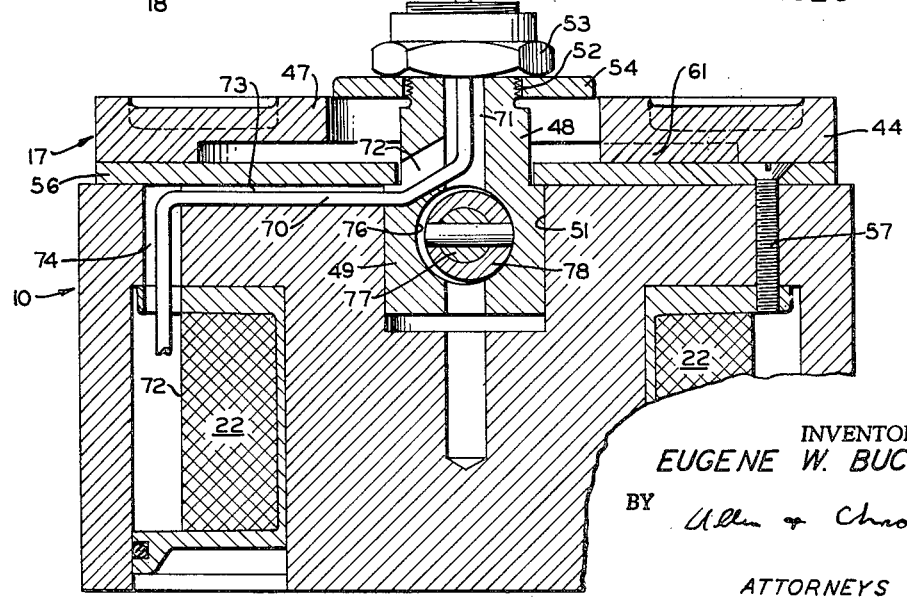
FIG_3
INVENTOR.
EUGENE W. BUCK
BY
ATTORNEYS July 17, 1962 E. W. BUCK 3,044,321
ADJUSTABLE MAGNETIC DRILL MOUNT
Filed Nov. 7, 1957 4 Sheets-Sheet 3
FIG_ 4
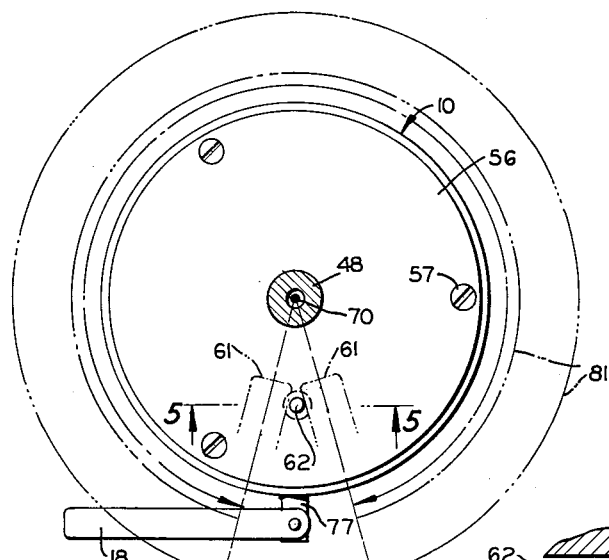
FIG_ 5
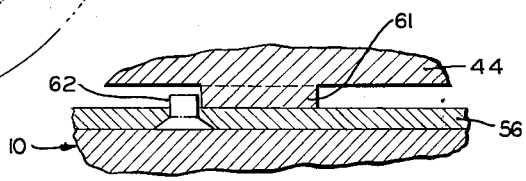
FIG_ 6
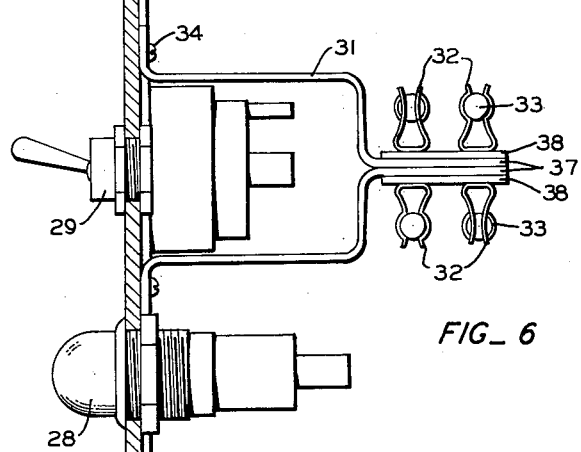
INVENTOR.
EUGENE W. BUCK
BY
ATTORNEYS July 17, 1962 E. W. BUCK 3,044,321
ADJUSTABLE MAGNETIC DRILL MOUNT
Filed Nov. 7, 1957 4 Sheets-Sheet 4
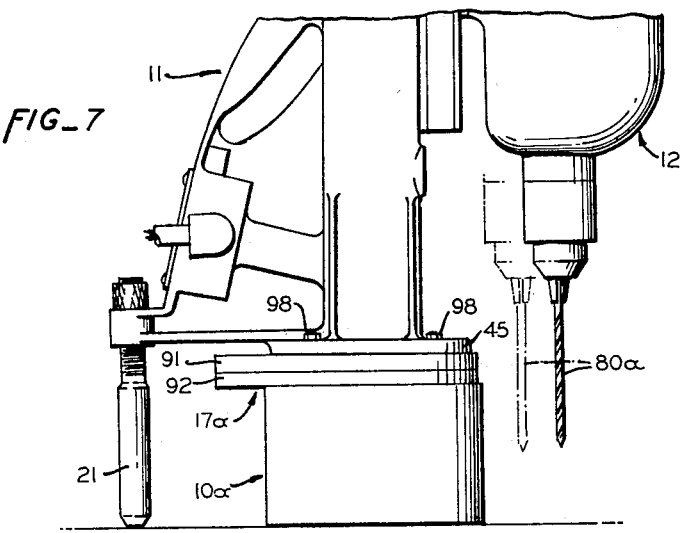
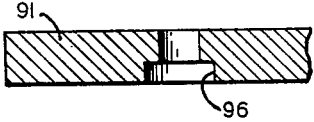
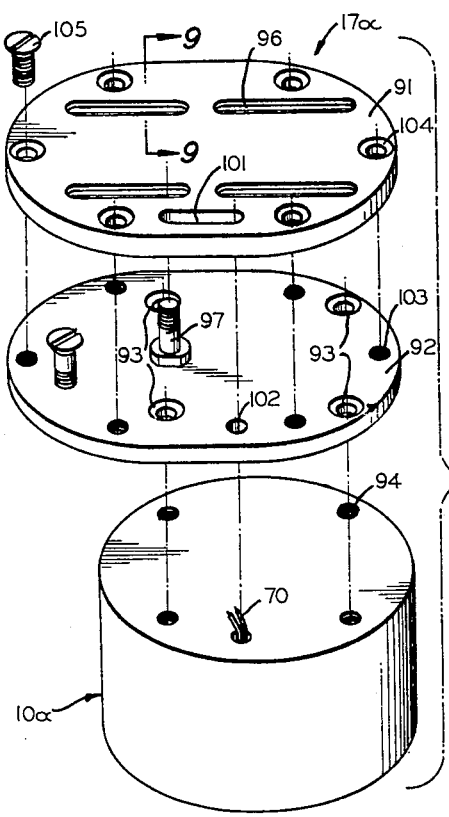
INVENTOR.
EUGENE W. BUCK
BY
ATTORNEYS

United States Patent Office 3,044,321
Patented July 17, 1962

3,044,321
ADJUSTABLE MAGNETIC DRILL MOUNT
Eugene W. Buck, Campbell, Calif., assignor to Buck Manufacturing Company, San Jose, Calif., a corporation of Delaware
Filed Nov. 7, 1957, Ser. No. 695,178
13 Claims. (Cl. 77—7)

The present invention relates to portable electromagnetic drill mounts, and is concerned more particularly with an improved drill mount of the above character in which the point of work of the tool can be adjusted with reference to the position of the magnetic base for the mount.

In the operation of electromagnetic drill mounts, for example, it is often desirable in certain types of work to provide for location of the drill mount on the work by energization of its magnetic base and to thereafter provide for adjustment of the drill to the point of drilling, or cutting, by movement of the drill or other tool on its base, thereby enabling location of the tool or structure in approximate position and a final precision adjustment of the actual point of work by adjustment of the tool. This adjustability feature also enables moving the location of the drill from one hole to another in certain instances without changing the position of the magnetic base of the tool.

Accordingly, it is a general object of the invention to provide an improved eletcromagnetic drill mount in which the drill or similar tool can be adjusted readily with respect to its supporting base.

Another object of the invention is to provide a drill mount of the above character in which the radial and circumferential adjustments with respect to the magnetic base can be made without interfering with the electrical connections to the base.

Another object of the invention is to provide an adjustable drill mount of the above character in which the circumferential adjustment can be made through a wide angle of approximately 330 degrees.

A further object of the invention is to provide a drill mount in which all of the electrical components are carried by a common mounting plate at a common location so as to be readily accessible for assembly and servicing.

The above and other objects of this invention are attained as disclosed in the accompanying description of a preferred embodiment, made with reference to the accompanying drawings, in which:

FIGS. 1-6 disclose a preferred embodiment of the invention.

FIG. 1 is a side elevational view of the drill mount;

FIG. 2 is a fragmentary plan view taken in a plane indicated by the line 2—2 in FIG. 1;

FIG. 3 is a vertical sectional view taken as indicated by the line 3—3 in FIG. 2;

FIG. 4 is a plan view of the magnetic base with the adjusting mechanism thereon as taken in the plane indicated by the line 4—4 in FIG. 1;

FIG. 5 is a fragmentary sectional view taken as indicated by the line 5—5 in FIG. 4;

FIG. 6 is a fragmentary sectional view taken as indicated by the line 6—6 in FIG. 1;

FIG. 7 is a fragmentary side elevational view similar to FIGURE 1;

FIG. 8 is an exploded perspective view of the parts enabling adjustment of the drill with respect to its magnetic base; and FIG. 9 is a fragmentary sectional view taken as indicated by the line 9—9 in FIG. 8.

In general, the adjustable electromagnetic drill mount is of the type disclosed in my co-pending application, Serial No. 626,341, filed December 5, 1956.

Referring to FIG. 1, the drill mount includes an electromagnetic base or base structure 10 forming a part of a frame structure including an upright housing or post structure 11, on which a portable electric drill 12 is mounted in a conventional manner on a slide 13 carried in suitable guides 14. The slide 13 is adjustable vertically with the portable electric drill 12 thereon, by means of the operating handle 16 in the conventional manner, for example, as disclosed in my application Serial No. 433,-582, filed June 1, 1954, now Patent No. 2,820,377.

Associated wtih the post structure 11 and the magnetic base structure 10, there is provided an adjusting means or structure 17 having a locking handle 18 associated therewith as described hereinafter. The drill mount also includes a stabilizing means or foot 21 and suitable electrical means for energizing a coil 22 of the magnet through a rectifier structure referred to hereinafter.

The electrical switches and components controlling the application of power to the various elements of the drill mount are all carried by a common mounting plate 26 (FIGS. 1 and 6) suitably secured to a boss 25 about an opening in the post structure 11 by suitable fastening screws 27. The plate 26 provides a mounting for a pilot light 28, an on and off switch 29 for controlling the current to the electromagnetic base 10, and a mounting bracket or element 31, which carries a plurality of spring clips 32 in which rectifiers 33 are mounted, such rectifiers being preferably of the silicon diode type. In general the bracket 31 is a U-shaped structure secured to plate 26 by screws 34 and has an extending tongue 37 on which insulating plates 38 are provided for mounting the spring clips 32 in insulated fashion. By removing the fastening screws 27, the plate 26 can be withdrawn from the post structure 11, and the length of wiring is such that the electrical components carried by the plate 26 are rendered freely available for inspection, testing or servicing.

Referring to FIG. 1, post structure 11 is provided with a plurality of bosses 41, in which perforated screens 42 are mounted to insure the passage of cooling air through the hollow post structure and past the rectifiers.

Referring to FIGS. 2-4, the adjusting structure 17 includes an upper member or plate 44 which is secured to the bottom flange 45 of the post structure 11 by a plurality of fastening screws 46. Centrally of the adjusting plate 44 there is provided a boss 47 which outlines an elongated opening therein whose length defines the dimension of radial adjustment of the plate 44 and the post structure 11 with respect to the magnetic base 10, and its width fits closely the diameter of a pivot and clamp post 48, whose enlarged lower end 49 seats within a bored recess 51 of the magnetic base 10, and whose upper end is threaded at 52 to receive a fastening nut 53 of the self locking type, a washer 54 being interposed between the nut 53 and the boss 47. To secure the post 48 with reference to the magnetic structure or magnetic base 10, a plate 56 is secured by a plurality of screws 57 to the top face of the magnetic base 10, and is centrally apertured to fit the upper portion of the stud 48 and overlie the shoulder provided by its enlarged bottom portion 49.

The adjusting plate 44 (FIG. 3) on its lower face is provided with a radially extending cast stop lug 61 for engagement with an upwardly extending pin 62 on the plate 56 to determine the two limit positions of adjustment of the post structure with reference to the magnetic base. In this way it is impossible to repeatedly twist the post structure in the same direction with reference to the magnetic base, and this eliminates excessive twisting stresses on the electrical leads 70 which extend from the post structure to the base.

To provide for these electrical leads 70, the post or stud 48 (FIG. 3) has a central aperture 71 intersecting a lateral passage 72 communicating with a radial recess 73 in the back of the electromagnetic base 10, and this latter recess 73 communicates with a vertical hole 74, giving access to the winding 22 of the magnet, so that the electrical connections can be made.

In order to lock the post structure to the magnetic base, or to release them for relative adjustment, the stud or post 48 is provided with a transverse aperture 76 in its bottom portion 49 which is aligned with similar apertures in magnetic base 10, to receive an adjusting rod 77, having an eccentric or cam 78 pinned thereon within the adjusting stud or post 48. By a 90 degree turn of the eccentric 78 from the position shown in FIG. 4, the nut 53 will be brought downwardly to clamp the parts in adjusted position. In the position shown the parts are free for adjustment of the drill bit 80 with reference to the work.

In operation with the clamping post 48 in its free condition as shown in FIG. 4, and with the magnetic base 10 energized, the post structure 11 with the drill 12 in its bit 80 can be adjusted to any desired position within a radial and circumferential area which is indicated in FIG. 4 by the dot-dash lines 81. After the drill bit is located properly to drill the hole, the locking handle 18 is adjusted to effect a clamping or locking movement of the clamping post 48 and the associated parts so that the drill bit is held securely for the drilling operation.

Referring to FIGURE 7, there is shown a modified form of the invention to be used where it is only desirable to adjust the drill bit 80a radially with respect to the electromagnetic base 10a, and in this form of the invention the adjusting structure 17a is also made up of an elongated upper plate 91 and an elongated lower plate 92 for attachment to each other and to the electromagnetic base 10a by suitable fastening screws or bolts.

The lower plate 92 is provided with four fastening apertures 93, and the electromagnetic base 10a is provided with a corresponding number and like pattern of apertures 94, thus enabling mounting of the plate 92 on the base. The lower plate 92 is also provided with six threaded apertures 103 and the upper plate 91 is provided with six countersunk apertures 104 to receive fastening screws 105 for securing the plates 91 and 92 together. As seen in FIGURE 7, the adjusting structure 17a projects to the left, but in assembly it could be made to project to the right, thereby providing a different range of adjustments.

To enable relative adjusting movement, the upper plate 91 is provided with four elongated slots 96 which are generally T-shaped in cross-section, as seen in FIGURE 9, to receive non-rotatably the heads of clamping bolts 97 which extend upwardly through the base flange 45 of the post structure 11 to receive nuts 98. By loosening the nuts 98 and thereby releasing the clamping action between the adjusting plates 91 and 92 and the base flange 45, the drill and its mounting structure including the post structure 11 can be moved with respect to the electromagnetic base 10a so as to place the drill bit 80a at a desired location. In this structure the base flange 45 is utilized as one member of the adjusting structure.

To provide for free passage of the electrical wires from the electromagnetic base 10a into the post structure 11, the lower plate 92 is provided with a fifth elongated recess 101, and the upper plate 91 is provided with an aperture 102 through which the wiring passes.

In operation, to effect the desired adjustable position of the drill bit 80a, after the electromagnetic base has been energized and secured to the work surface, the nuts 98 are loosened to release the clamping action between the respective plates 91 and 92 and thereby enable the relative movement to place the drill bit 80a in the desired position. After positioning the nuts 98 are again tightened on their bolts 97 to lock or clamp the post structure 11 in the selected adjusted position.

While I have shown and described certain preferred embodiments of the invention, it will be apparent that the invention is capable of variation and modification from the form shown so that the scope thereof should be limited only by the scope of the claims appended hereto.

I claim:

1. In an electromagnetic drill mount, a frame structure having means for supporting a drill and including a magnetic base structure for said frame structure, an electromagnet winding in said base structure having electrical connections extending therefrom, means providing for relative movement between said base structure and said frame structure including a first member connected to said base structure and a second member connected to said frame structure, one of said members including a slot and the other of said members having an element engaged with and movable in said slot, said element comprising a connection between said members, said element having an opening for receiving said electrical connections whereby such connections may be extended into the upper part of said frame structure, and means for releasably clamping said members together in a selected adjusted position thereof, said connection between said members providing for adjustable positioning of said drill with respect to said base structure.

2. In an electromagnetic drill mount, a frame structure having means for supporting a drill and including a magnetic base structure for said frame structure, an electromagnet winding in said base structure having electrical connections extending therefrom, adjusting means providing for relative movement between said base structure and said frame structure including means forming a slot extending transversely of one of said structures and an element connected to the other of said structures and engaged with and movable in said slot, said element comprising a connection between said members, said element having an opening for receiving said electrical connections whereby such connections may be extended into the upper part of said frame structure, and means for releasably clamping said structures together in a selected adjusted position thereof, said connection between said structures providing for adjustable positioning of the location of said drill with respect to said base structure.

3. In an electromagnetic drill mount, a frame structure comprising an upright post having means for supporting a drill bit for vertical adjusting movement with respect thereto, a base structure forming a supporting foot for said frame structure and including an electromagnet having a core, a plate-like member secured to the upper surface of said electromagnet, a base member for said post secured thereto and engaging at its bottom surface the upper surface of said plate-like member, said plate-like member having an opening therein, said base member also having an opening therein, a clamping member extending through said openings, said clamping member having a head positioned in said core, said clamping member also having means for clamping said base member and said plate-like member together, said head of said clamping member having an aperture extending transversely therethrough, clamping means supported in said electromagnet and having an eccentric secured thereon in said transversely extending aperture of said head, and an operating handle for said clamping means extending from the side of said electromagnet, said clamping means serving to secure said post and said electromagnet in a selected relatively adjusted position.

4. In an electromagnetic drill mount, a frame structure comprising an upright post having means for supporting a drill bit for vertical adjusting movement with respect thereto, a base structure forming a supporting foot for said frame structure and including an electromagnet, a plate-like member secured to the upper surface of said electromagnet, said electromagnet having electrical connections extending therefrom, a base member for said post secured thereto and engaging at its bottom surface the upper surface of said plate-like member, said plate-like member having an opening therein, said base member also having an opening therein, and clamping means extending through said openings and having means for clamping engagement on opposite sides of said base member and said plate-like member, said clamping means having an opening therethrough for receiving said electrical connections whereby said electrical connections extend into said upright post from said electromagnet without interfering with the adjustment of said plate-like member on said base member.

5. In an electromagnetic drill mount, a frame structure comprising an upright post having means for supporting a drill bit for vertical adjusting movement with respect thereto, a base structure forming a supporting foot for said frame structure and including an electromagnet, a plate-like member secured to the upper surface of said electromagnet, a base member for said post secured thereto and engaging at its bottom surface the upper surface of said plate-like member, connecting means between said plate-like member and said base member providing for adjusting movement therebetween to position said drill bit both radially and rotatively with respect to said electromagnetic base, stop means positioned on the bottom of said plate-like member and the top of said electromagnet for limiting said rotative adjustment, a pair of handles on said mount providing for gripping by the hands to effect said relative adjustment, one of said handles also forming a part of clamping means for securing the drill mount in a selected adjusted position and electrical connections extending from said electromagnet through a passage in said plate-like member into said frame structure.

6. In an electromagnetic drill mount, a hollow frame structure having means for supporting a drill and including a magnetic base structure for said frame structure, an electromagnetic coil in said base structure, means providing for relative movement between said base structure and said frame structure including means connecting said structures and providing for adjustable positioning of said drill with respect to said base structure, means for securing said structures together in a selected adjusted position thereof, passage means in said securing means, and connections extending from said coil through said passage means and into said hollow frame structure.

7. In an electromagnetic drill mount, a frame structure comprising an upright post having means for supporting a drill bit for vertical adjusting movement with respect thereto, a base structure forming a supporting foot for said frame structure and including an electromagnet, a plate-like member secured to the upper surface of said electromagnet, a base member for said post secured thereto and engaging at its bottom surface the upper surface of said plate-like member, said plate-like member having an opening therein, said base member also having an opening therein, electrical connections extending through said openings from said electromagnet into said frame structure and means for clamping said base member and said plate-like member together, one of said members carrying a stop element, and the other of said members having means for engagement by said stop element when the relative rotative adjustment of said structure approaches a full turn.

8. In an electromagnetic drill mount, a frame structure comprising an upright post having means for supporting a drill bit for vertical adjusting movement with respect thereto, a base structure forming a supporting foot for said frame structure and including an electromagnet, a plate-like member secured to the upper surface of said electromagnet, a base member for said post secured thereto and engaging at its bottom surface the upper surface of said plate-like member, said plate-like member having an opening therein, said base member also having an opening therein, electrical connections extending through said openings from said electromagnet into said frame structure and means for clamping said base member and said plate-like member together, said members including stop means for limiting relative rotative adjustment therebetween to almost a full turn.

9. In an electromagnetic drill mount, a frame structure comprising an upright post having means for supporting a drill bit for vertical adjusting movement with respect thereto, a base structure forming a supporting foot for said frame structure and including an electromagnet, a plate-like member secured to the upper surface of said electromagnet, a base member for said post secured thereto and engaging at its bottom surface the upper surface of said plate-like member, said plate-like member having an opening therein, said base member also having an opening therein, a clamping member seated in said magnet and extending through said openings and having means for clamping said base member and said plate-like member together, said clamping member and said magnet having aligned apertures extending transversely therethrough, clamping means supported in the aperture of said magnet and having an eccentric secured thereon in said transversely extending aperture of said clamping member, and an operating handle for said clamping means, operation of said clamping means serving to secure said post and said electromagnet in a selected relatively adjusted position.

10. In an electromagnetic drill mount, a frame structure comprising an upright post having means for supporting a drill bit for vertical adjusting movement with respect thereto, a base structure forming a supporting foot for said frame structure and including an electromagnet, means connecting said base structure and said post for relative adjusting movement to vary the position of the drill bit with reference to said electromagnet, electrical connections extending from said post to said magnet including a portion in axial alignment with said electromagnet, and passage means in said magnet for said electrical connections.

11. In an electromagnetic drill mount as recited in claim 10 in which said pivot member also provides means for clamping the post structure to the electromagnetic base, and control means for said clamping means including a clamping member mounted in said electromagnet and having a handle exteriorly thereof.

12. In an electromagnetic drill mount, a frame structure comprising an upright post having means for supporting a drill bit for vertical adjusting movement with respect thereto, a base structure forming a supporting foot for said frame structure and including an electromagnet, a pivot member mounted in said electromagnetic base centrally thereof, and said post having means at its base to engage said pivot member for limited adjusting movement with respect thereto.

13. In an electromagnetic drill mount, a frame structure comprising an upright post having means for supporting a drill bit for vertical adjusting movement with respect thereto, a base structure forming a supporting foot for said frame structure and including an electromagnet having a core, a plate-like member secured to the upper surface of said electromagnet, a base member for said post secured thereto and engaging at its bottom surface the upper surface of said plate-like member, said plate-like member having an opening therein, said base member also having an opening therein, a clamping member extending through said openings, said clamping member having a head positioned in said core, said clamping member also having means for clamping said base member and said plate-like member together, said head of said clamping member having an aperture extending transversely therethrough, clamping means supported in said electromagnet and having an eccentric secured thereon in said transversely extending aperture of said head and an operating handle for said clamping means extending from the side of said electromagnet, said clamping means serving to secure said post and said electromagnet in a selected relatively adjusted position, said clamping member having an elongated slot therein for passage of electrical wiring to said electromagnet from the interior of said post.

References Cited in the file of this patent

UNITED STATES PATENTS

| | | |
|---|---|---|
| 676,043 | Lincoln | June 11, 1901 |
| 2,672,770 | Buck | Mar. 23, 1954 |
| 2,938,411 | Herfurth | May 31, 1960 |

FOREIGN PATENTS

| | | |
|---|---|---|
| 399,400 | France | June 28, 1909 |